US006296181B1

(12) United States Patent
Noblet et al.

(10) Patent No.: US 6,296,181 B1
(45) Date of Patent: Oct. 2, 2001

(54) INTERLOCKING DOOR SEAM

(75) Inventors: C. Dale Noblet, San Bernardino, CA (US); Stephen R. Packer, Las Vegas, NV (US)

(73) Assignee: Can-Am Marketing Corporation, Inc., Las Vegas, NV (US)

( * ) Notice: Subject to any disclaimer, the term of this patent is extended or adjusted under 35 U.S.C. 154(b) by 0 days.

(21) Appl. No.: 09/273,682

(22) Filed: Mar. 22, 1999

(51) Int. Cl.[7] .................................................... B65G 11/04

(52) U.S. Cl. ................................ 232/45; 232/24; 232/25; 312/292; 49/367

(58) Field of Search ................................. 232/45, 24, 25, 232/17, 19; 312/292, 324; 70/416, 417, 418; 292/346; 49/367

(56) References Cited

U.S. PATENT DOCUMENTS

| | | | |
|---|---|---|---|
| 693,770 * | 2/1902 | Wright et al. . | |
| 1,365,960 * | 1/1921 | Abbett . | |
| 1,459,031 * | 6/1923 | Murphy . | |
| 1,642,533 * | 9/1927 | Beer . | |
| 1,817,191 * | 8/1931 | Harmony . | |
| 2,049,796 | 8/1936 | Barry . | |
| 2,470,799 | 5/1949 | Ames . | |
| 2,495,537 | 1/1950 | Mousel . | |
| 2,529,994 | 11/1950 | Brezek . | |
| 2,556,464 | 6/1951 | Brezek . | |
| 2,557,908 | 6/1951 | Cross . | |
| 2,576,503 | 11/1951 | Dean . | |
| 2,731,098 | 1/1956 | Saives . | |
| 2,779,164 | 1/1957 | Doane . | |
| 2,787,206 | 4/1957 | Dustman . | |
| 2,803,512 * | 8/1957 | Band . | |
| 2,918,319 | 12/1959 | Richardson . | |
| 3,405,962 | 10/1968 | Sushan . | |
| 3,592,498 | 7/1971 | Raccuglia, Sr. . | |
| 3,969,845 * | 7/1976 | Yulkowski | 49/367 X |
| 4,072,487 | 2/1978 | Irwin . | |
| 4,257,633 | 3/1981 | Rosenberg . | |
| 4,345,787 | 8/1982 | Dabrowski . | |
| 4,350,084 | 9/1982 | Azzola . | |
| 4,725,084 | 2/1988 | Catricola . | |
| 4,751,834 | 6/1988 | Beck . | |
| 4,861,082 | 8/1989 | Priola et al. . | |
| 5,074,606 | 12/1991 | Priola et al. . | |
| 5,395,145 | 3/1995 | Allenbaugh . | |
| 5,406,814 | 4/1995 | Zeager et al. . | |
| 5,415,020 | 5/1995 | Allenbaugh . | |
| 5,472,378 | 12/1995 | Skoff . | |

(List continued on next page.)

*Primary Examiner*—Lynne H. Browne
*Assistant Examiner*—James M Hewitt
(74) *Attorney, Agent, or Firm*—Cislo & Thomas, LLP

(57) ABSTRACT

An interlocking door seam provides a stronger seam for double doors, making them less subject to attack by prybars and the like. Particularly for central mail stations (CMS) and central box units (CBU), double doors present there are subject to attack by prybars and the like that force the locks and allow thieves to rifle the contents of the enclosed mail boxes. Attachment of interlocking door seam [of the present invention] to the first edge of the first double doors protects that first edge from prybar attacks. The adjoining edge of the second double door then releasably fits into a convex strip that protects the adjoining edge of the second double door, thereby protecting it from prybar attack. The interlocking door seam allows normal operation of the double doors while decreasing the risk to the central mail station of prybar attack at the seam between the double doors. Flanges present along the free edge of the convex strip provide easy engagement of that free edge. Gaps between such flanges accommodate shelving inside the central mail station. Construction of the interlocking door seam [of the present invention] by tempered steel or hard and durable materials provides enhanced protection from prybar attack.

5 Claims, 5 Drawing Sheets

U.S. PATENT DOCUMENTS

| | | | | |
|---|---|---|---|---|
| 5,566,995 | | 10/1996 | Jagiela . | |
| 5,771,720 | | 6/1998 | Levenson . | |
| 5,794,844 | * | 8/1998 | Jenkins | 232/25 |
| 5,820,018 | * | 10/1998 | Stacy | 232/24 |
| 5,820,019 | * | 10/1998 | Spitale | 232/25 |
| 6,003,761 | * | 12/1999 | Chapman | 232/24 |

* cited by examiner

FIG. 9
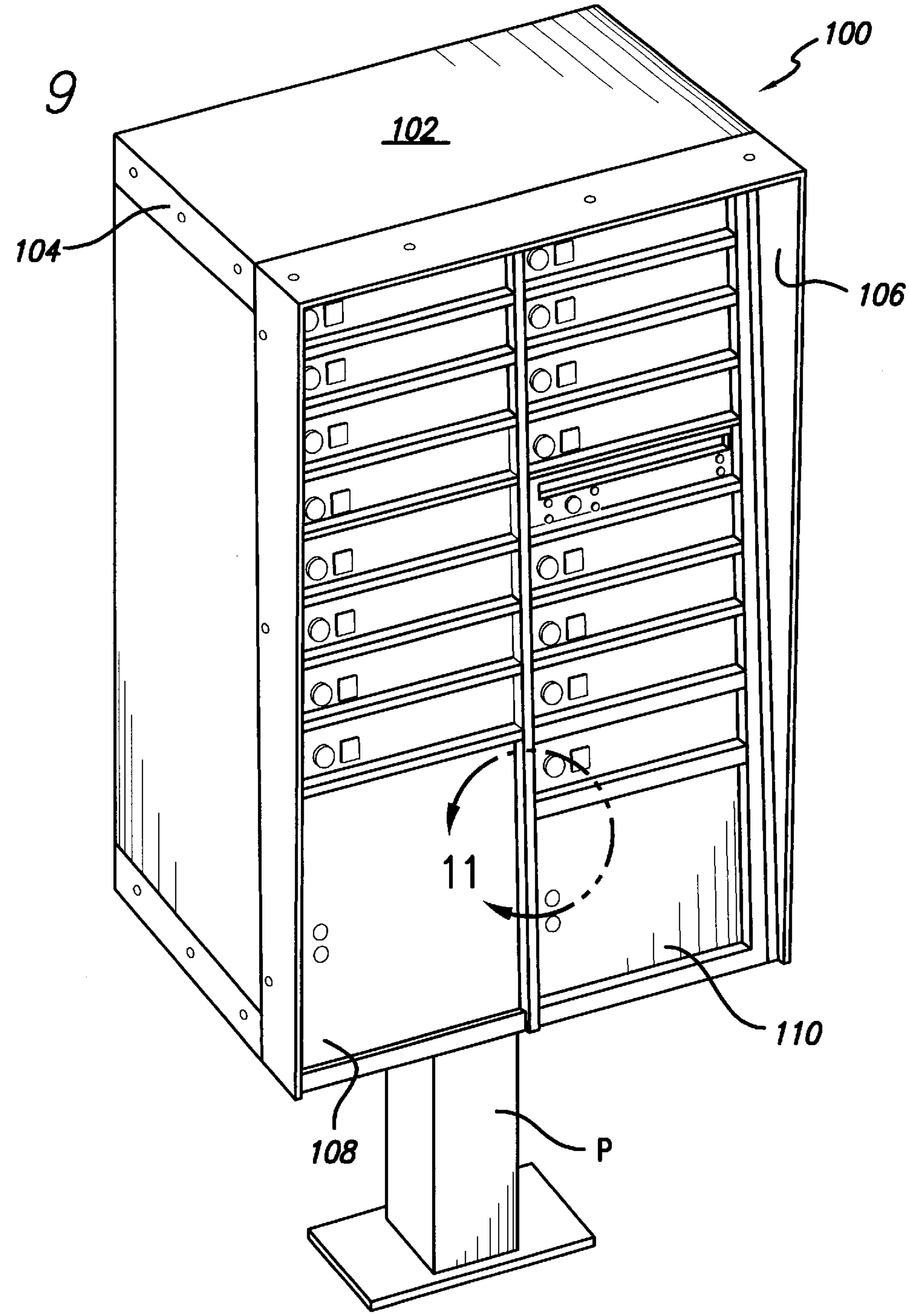
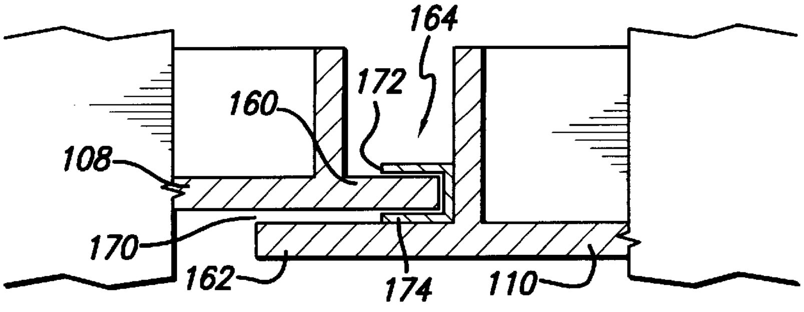
FIG. 11

INTERLOCKING DOOR SEAM

BACKGROUND OF THE INVENTION

1. Field of the Invention

This invention relates to door protection and the like and more particularly to a pry-proof seam for interlocking mail station doors.

2. Description of the Related Art

In the past, mail boxes for the delivery and receipt of mail have been associated with individual dwellings such as single family residences. The mail person on foot could deliver mail to the mail box, or by driving a mail truck or the like, deliver the mail to mail boxes situated adjacent to the road.

Recently, tampering with mail left in such mail boxes has become a problem such that the mail must be secured under lock and key. This also provides some privacy for the recipient of the mail. Additionally, central box units or central receiving stations are often installed in new home developments. These central units contain a plurality of individual mail boxes for several of the residents in the adjacent area. The mail person then only has to stop at the central station to deliver mail to a number of people simultaneously, allowing him or her to cover a larger number of residents with mail delivery.

The central box units used in such new housing developments often have a five sided box unit with the sixth side accessible via lockable double doors. These double doors often have a central seam as they are hinged on their outward sides. By unlocking the double doors, they swing outward to open up the central postbox area for simultaneous delivery by the mail person. The side opposite of the double doors may have a number of individually locked mail boxes so that each individual with a mail box may retrieve their mail separately and securely as each key is unique to the appropriate mail box.

Postal regulations control the construction of such central box units in order to provide durable and accessible mail stations to which the mail person can deliver mail. However, such postal regulations may presume that the mail stations are subject only to environmental attack, such as by wind or rain. Unfortunately, it is not difficult to take a prybar, such as a crowbar or the like, and force it in between the seam present between the two double doors. The doors are then jimmied by popping the lock bar out from its place behind the second door. Upon so forcing the double doors open, the mail is available to any thief such as the one who originally used the prybar. Checks and other financial instruments may be stolen and fraudulently converted into cash, providing the incentive to break and enter into other central post box stations or even the same one on an intermittent or regular basis.

Consequently, there is a need in the art to provide means by which the seam between the two double doors in central post box stations may be less subject to attack by prybars and the like. The present invention provides a solution to this criminal problem while maintaining the easy and desirable access necessary for the central post box station.

SUMMARY OF THE INVENTION

The present invention provides means by which the central seam between two double doors of the central post box station may be protected from prybars and the like. This prevents thieves from jimmying the lock or otherwise forcing the doors open with prybars so that the contents of the mail station can be rifled in order to steal valuable mail contained therein.

The interlocking door seam of the present invention has a first strip generally extending straight along its length. An extending flange along this first concave strip allows it to securely attach to a first one of the double doors in the central post box station. The edge of the first double door is confined and protected by the interstitial space defined by the concave nature of the first strip. The first strip bends around the edge of the first door holding it therein even though the edge of the door may be angled at its end thus occupying slightly more space than a straight door would.

While the first concave strip is attached to the first double door, the free end of the first concave strip bends around, backing away from the concave interstitial space of the first concave strip. In the bending away from the first concave strip, a second convex strip is defined that can receive the second double door at its free end. The interstitial space defined by the second convex strip allows the release or engagement of the free end opposite the hinges of the second door. When the second double door edge fits into the second convex strip, it is protected and shielded from the active end of a prybar or the like. In an additional embodiment, flanges may be present that aid and guide the entry of the second double door edge into the convex strip. Such flanges may define gaps between them in order to accommodate shelving defining individual post boxes within the central mail station.

By providing an interlocking door seam for central post box stations, the central stations are rendered more secure from forced entry, thereby creating more privacy and less risk of holding mail in the central mail station. Additionally, the interlocking door seam of the present invention is easily accommodated by existing central post box stations, or central base units, with their post boxes in a retrofit procedure.

The interlocking door seam may be incorporated en masse into a cluster box unit (CBU) in order to provide a more secure mail delivery system. Additional security measures may also be taken beyond that of protecting the common seam between the two double doors in such a CBU. With respect to the double doors, a central sliding linkage may be used that slidably engages door pins present on the facing sides of the double doors so that they are held closed until the sliding linkage is lifted from place. Held downward by its own weight under gravity, the sliding linkage prevents the door pins from disengaging the sliding linkage. However, upon the post person opening the mail retrieval door and lifting the sliding linkage lever, the entire sliding linkage disengages the door pins so that both doors are able to swing free and expose all of the interior mail slots.

Additional security is provided by the individual mailbox slot doors. Instead of having a cam simply protrude through the mailbox slot door frame, an extending side flange to the mailbox slot door is also present and is a physical structure through which the cam passes in order to securely and fully lock the mailbox slot door. By providing the flange mailbox slot door, attack upon the lock, as by a slide hammer or the like, does not allow the thief or perpetrator to open the mailbox slot door. The cam does not disengage from the mailbox slot door as it passes through the side flange. If the side flange were absent, the slide hammer attack against the mailbox slot door would allow the cam to disengage from the door, allowing the door to swing open freely.

The CBU may be made of 18 gauge or other heavy stainless steel to provide a strong barrier against physical attack and in order to protect the mail inside.

OBJECTS OF THE INVENTION

It is an object of the present invention to provide a more secure central box unit for central mail stations.

It is another object of the present invention to provide an interlocking door seam that better secures double doors on central post box stations.

It is another object of the present invention to provide an interlocking door seam that is easily retrofittable to existing central post box stations.

It is yet another object of the present invention to provide an interlocking door seam for central post box stations that accommodates existing internal structures such as shelving and the like.

It is another object of the present invention to secure double doors from being pried apart with a prybar or the like.

It is an additional object of the present invention to pry-proof double doors by providing an interlocking door seam that protects and shields the otherwise exposed adjoining edges of the double doors.

It is an object of the present invention to provide a more secure cluster box unit (CBU) to protect mail.

These and other objects and advantages of the present invention will be apparent from a review of the following specification and accompanying drawings.

BRIEF DESCRIPTION OF THE DRAWINGS

FIG. 9 is a right top perspective view of the cluster box unit (CBU) of the present invention with its double doors closed.

FIG. 11 is a cross-sectional view of the closed double doors taken from an area generally corresponding to Circle 11 in FIG. 9.

DESCRIPTION OF THE PREFERRED EMBODIMENT(S)

The detailed description set forth below in connection with the appended drawings is intended as a description of a presently preferred embodiment of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequence may be accomplished by different embodiments that are also intended to be encompassed within the spirit and scope of the invention.

Figures 1, 2, 3, 4:
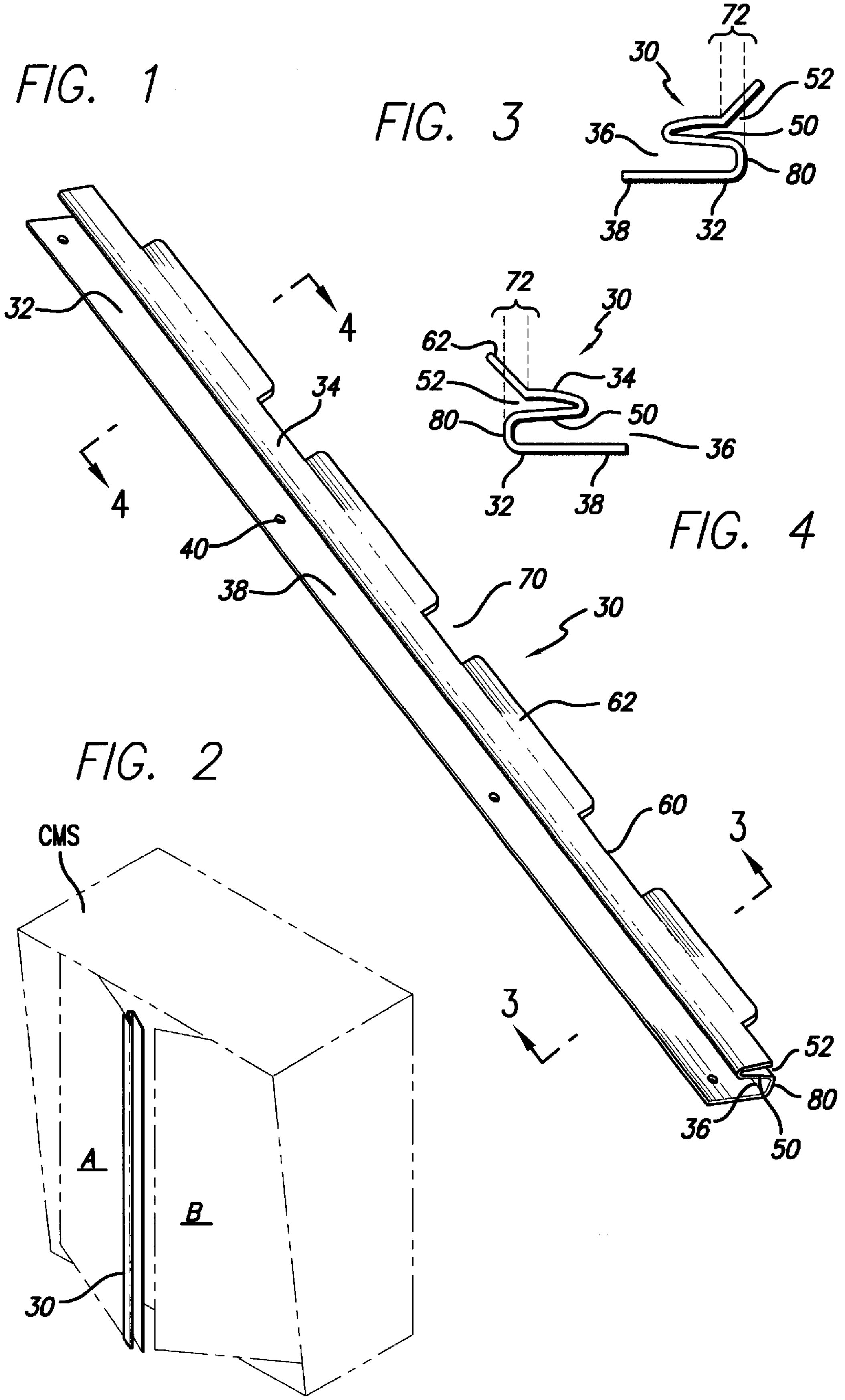
FIG. 1 is a perspective view of the interlocking door seam of the present invention with the top edge at the bottom of the figure.
FIG. 2 is a top and side perspective view of the interlocking door seam of the present invention shown in conjunction with a central post box station, the central post box station shown in phantom.
FIG. 3 is a side cross sectional view of the interlocking door seam of FIG. 1 taken along line 3—3.
FIG. 4 is a side cross sectional view of the interlocking door seam of FIG. 1 taken is 5 along line 4—4.
Figure 5:
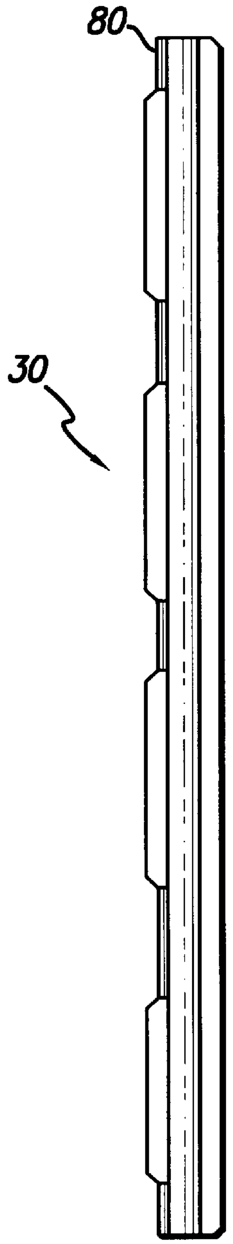
FIG. 5 is a rear plan view of the interlocking door seam of FIG. 1.
Figure 6:
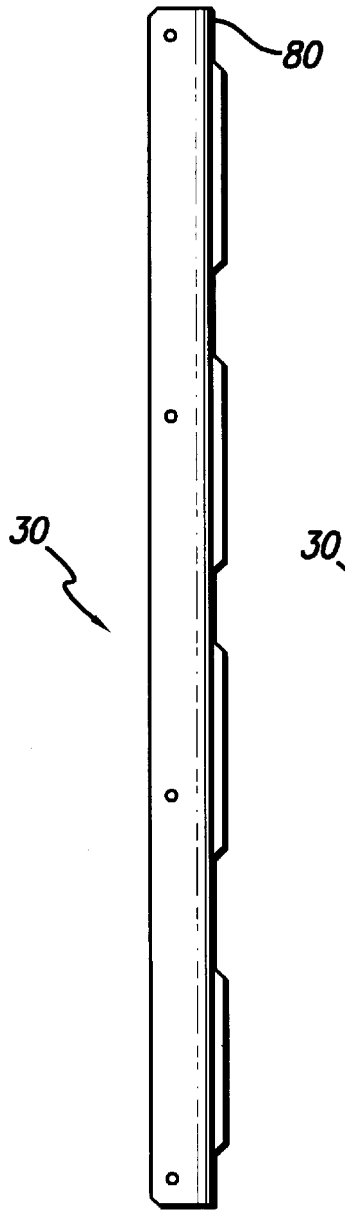
FIG. 6 is a front plan view of the interlocking door seam of FIG. 1.
Figure 7:
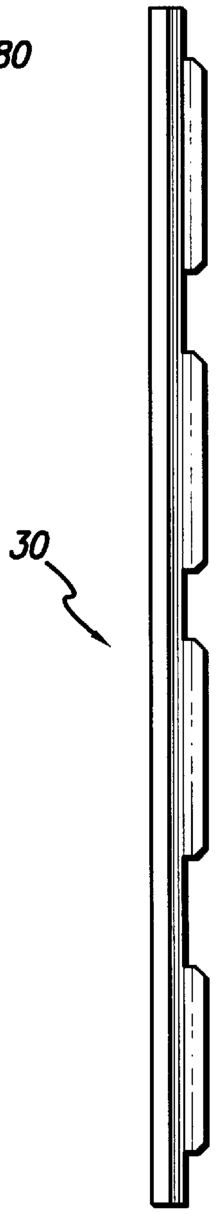
FIG. 7 is a right side elevational view of the interlocking door seam of FIG. 1.
Figure 8:
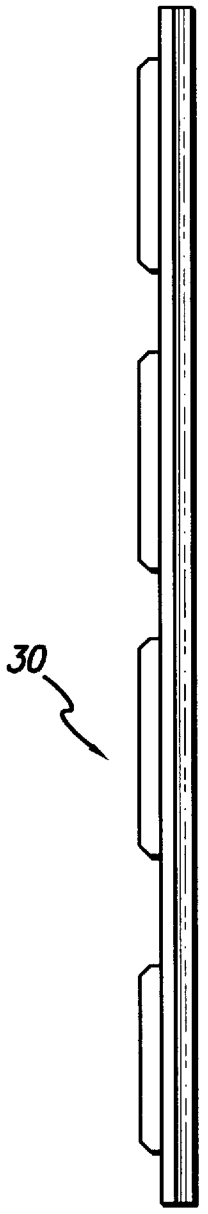
FIG. 8 is a left side elevational view of the interlocking door seam of FIG. 1.

Beginning with FIG. 1, the interlocking door seam 30 of the present invention is shown with its concave 32 and convex 34 strips. The interlocking door seam 30 may be made of tempered steel or the like in order to provide strength and constructural integrity, particularly should it be subject to attack by a prybar or the like. The concave strip 32 defines the interstitial space 36 into which one of two double doors present in a central mail station (CMS) fits. The interstitial space of the concave strip 32 is sufficiently wide and deep to accommodate the edge of the first double door A including the situation where the edge of double door A is angled.

Additionally, the concave strip 32 may have an extending flange 38 into which holes or apertures 40 may be present, allowing attachment of the interlocking door seam 30 to the first double door A. The extending flange 38 provides additional protection for the edge of double door A while allowing greater securement of attachment of the interlocking door seam 30 to double door A. Whereas, screws, bolts, or the like may be used to secure the interlocking door seam 30 to the first double door A by attachment through the flange apertures.

The convex strip 34 curves away from the concave strip 32 thus giving rise to the general geometrical language used herein to describe the concave nature of concave strip 32 with respect to double door A and the convex nature of the convex strip 34 with respect to double door A. The concave strip 32 and convex strip 34 share a common edge 50 giving rise to the compact nature of the interlocking door seam 30 of the present invention.

FIG. 1 shows the interlocking door seam in a manner that might be considered upside down and backwards from the configuration shown in FIG. 2. The lower part of the interlocking door seam 30 in FIG. 1 corresponds to the upper part of the interlocking door seam 30 in FIG. 2. However, due to the relative proportions enjoyed between the concave 32 and convex 34 strips, in order to better show the interlocking door seam 30 of the present invention, the arrangement shown in FIG. 1 was achieved.

As the concave 32 and convex 34 strips share the common edge 50, a compact and efficient interlocking door seam 30 is achieved that optimizes the material and space used to prevent prybar attack upon the double doors A, B of the central mail station (CMS). The convex strip 34 is generally aligned with the concave strip 32 in order to accommodate the alignment between the two double doors A, B. The interstitial space 52 present between the opposite sides of the convex strip 34 is sized to accommodate the free edge of double door B. Generally, such second double doors do not have angled edges such as those that might be present in double door A to which the interlocking door seam 30 may be attached. Consequently, the interstitial space 52 of the convex strip 34 may be correspondingly smaller in order to provide a closer fit and enhanced shielding.

Running along the free edge 60 of the convex strip 34 are a number of spaced flanges 62. These flanges 62 provide means for guiding the free adjoining edge of double door B into the interstitial space 52 of the convex strip 34. The flanges 62 are angled outwardly from the convex strip 34 in order to provide a greater area available to receive the free edge of double door B. Upon contacting the flange of 62, the free end of double door B is guided into the interstitial space 52 present along the convex strip 34.

The flanges 62 may be spaced apart by gaps 70. The gaps 70 may be present in order to accommodate shelving or other internal supporting structures which would otherwise interfere with the closing of double doors A, B when the flanges 62 are pressed into the confines of the central mail station (CMS) by the closing of the double doors A, B. The shelving may fit into the gaps 70 and be accommodated thereby. Additionally, vertical retention of the interlocking door seam 30 may be achieved as the shelving may interfere with the vertical travel of the flanges 62. Should the interlocking door seam move vertically, the flanges 62 will abut the adjacent shelves. This prevents stress upon the hinges of the double doors A, B and enhances their stability.

Once the interlocking door seam 30, the present invention, has been attached to double door A or the like by rivets or otherwise, the interlocking door seam 30 is ready to prevent pry bars and the like from forcing open the double doors A, B.

Once the interlocking door seam 30 has been attached to double door A, the concave strip 32 protects the free edge of double door A from attack by prybars or the like. When the double doors A, B are closed, the free edge of double door B fits into the interstitial space 52 of the convex strip 34. The free end of double door B is thereby protected from prybar attack and the like, as is the seam between double doors A, B. The exposed curve 80 present between the two opposing portions of the concave strip 32, is generally not subject to prybar attack due to its strength, durability, and lack of an exposed edge. When a prybar is used to force its way into the interstitial space 52 of the convex strip 34, the prybar will encounter the second double door B and find little, if any, edge upon which to exercise its leverage. The close fit between double door B and the common edge 50 serve to prevent prybar attack thereupon. It is difficult for a prybar to get a grip or edge there, as is true for the entire interlocking door seam 30. In fact, when prybar attack is made there, the interstitial space 52 serves to force the convex strip 34 closer to the concave strip 32 thereby enhancing the security effect of the interlocking door seam 30 of the present invention.

While the interstitial space 52 of the convex strip 34 is narrow, the flanges 62 serve as means by which the free edge of double door B may be easily fitted into the convex strip 34. Additionally, as shown in the cross section FIGS. 3 & 4, there is an offset 72 present between the common edge 50 (between the concave 32 and the convex 34 strips) and the flanges 62. Thus, when the free edge of double door B is guided toward the convex strip 34 by the flanges 62, that free edge will travel along the flanges 62 until it engages the common edge 50 where it is guided into the interstitial space 52.

As the interlocking door seam 30 of the present invention provides greater means by which the seam present between double doors A, B may be secured, thieves will be deterred from successfully prying open the central mail station (CMS) and rifling the contents therein for personal gain. Material currently used for central mail stations (CMS) may continue to be used for such stations, however, with the fortified seam provided by the interlocking door seam 30, such central mail stations (CMS) are less subject to successful attack.

The interlocking door seam of the present invention may also be incorporated ab initial into a cluster box unit (CBU) in order to provide a more secure mail station for the temporary holding of delivered mail until it can be received by the recipient.

As shown in FIGS. 9–14, the CBU 100 of present invention appears generally to be a nondescript mail station for the temporary holding of mail for its recipients. However, upon closer inspection (FIG. 10), the CBU 100 has many security features in order to defeat the interest of an mischievous thief from interfering with the proper delivery of mail.

Referring to FIG. 9, the CBU 100 is generally encased in a thick shell 102 of 18 gauge or other stainless steel that circumscribes five of the six sides of the generally-rectangular prism defined by the CBU. Rivets or other reinforced attachments may sturdily connect different sections of the CBU. Furthermore, a pedestal P may provide vertical support, lifting the CBU 100 off of the ground for easier access. Furthermore, a shroud or extended flange 106 may circumscribe the double doors 108, 110 on three sides to provide protection from the elements, such as wind and rain.

Referring now to FIG. 9, the double doors 108, 110 both articulate with respect to the main portion 112 of the CBU 100. The reinforced, protected, or otherwise secure hinges 114 provide the pivot upon which the doors 108, 110 articulate. When closed, the doors 108, 110 securely enclose the slotted or shelved confines of the main or chassis portion 112 of the CBU. By articulating upon hinges 114, the double doors 108, 110 provide open, free, and full access to the confines of the chassis 112 when the double doors 108, 110 are open. The present invention provides several different mechanisms by which the confines of the CBU chassis 112 are securely confined so that the mail left for a particular recipient is held in safekeeping until retrieval.

As set forth above, first and foremost of the means by which such mail is secured is the use of heavy and/or reinforced materials that withstand physical attack without breaking. 18 gauge stainless steel or the like is advantageously used in the present circumstances and can form the entirety of the CBU 100. Other similar or durable materials may also be used to good advantage.

Beyond the use of resilient strong and tamper-resident materials, the articulating elements of the CBU 100 are each individually subject to securement and/or locking in order to provide secure, but selectable, access to the confines of the CBU 100 on an individual basis or in its entirety.

As set forth above for the interlocking door seam 30, each of the doors 108, 110 is circumscribed by a flange 120, 122 (respectively). The flanges 120, 122 serve to extend the circumference of the doors 108, 110 in order to eliminate edges against which a pry bar or the like might be applied. As is well known, pry bars, such as crowbars and the like, could be used to jimmy or force open a door, particularly one with an exposed edge that lends itself to such attack. As set forth in more detail below, the most vulnerable edges, namely those establishing the shared seam between the doors 108, 110, are generally secured in a redundant manner.

Figure 10:
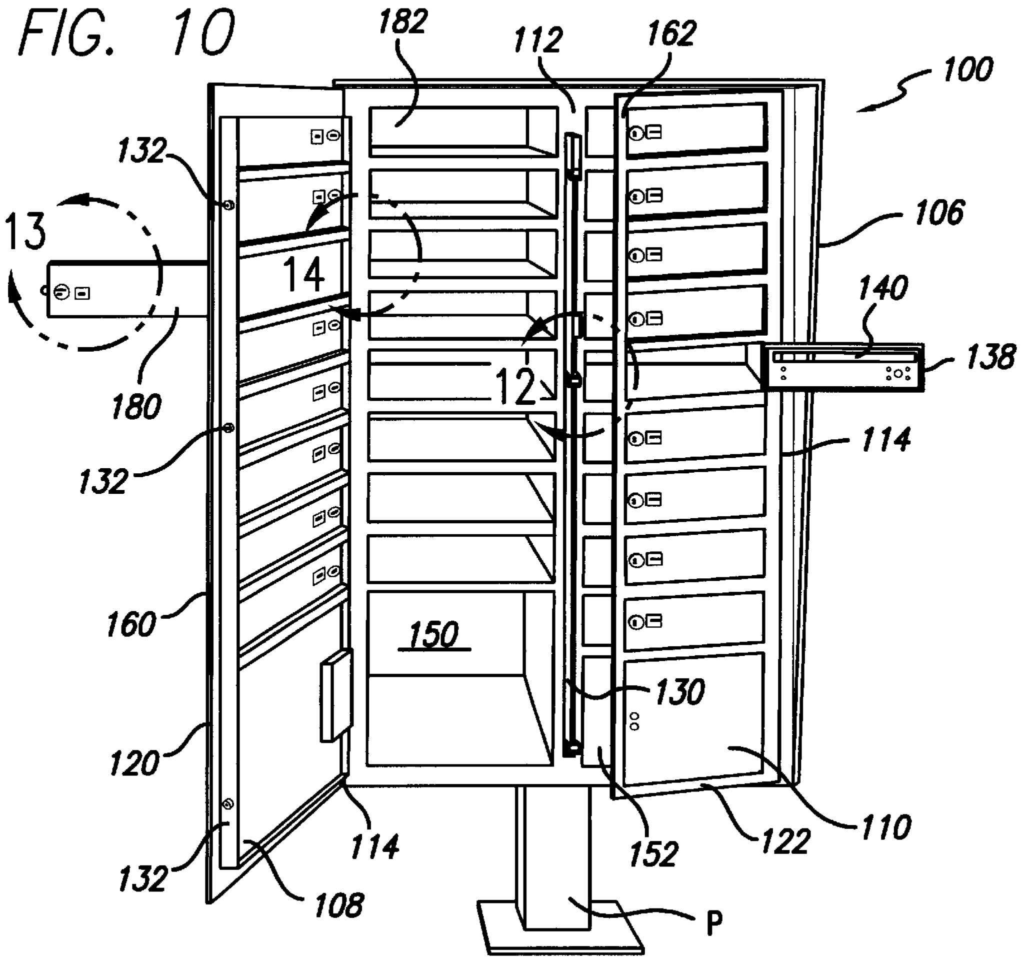
FIG. 10 is a right front view of the CBU with the right door fully and the left door partially open. Individual mail box slot doors are also shown in an open position.
Figure 12:
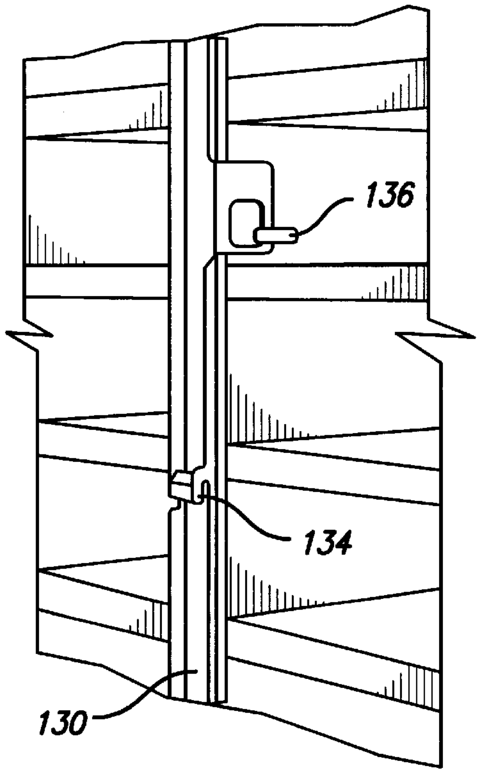
FIG. 12 is a partial left side perspective view of the sliding linkage latch system as indicated by Circle 12 in FIG. 10.

As shown in FIG. 10, and more particularly in greater detail in FIG. 12, the double doors 108, 110 are held closed by a sliding linkage 130. The sliding linkage 130 is generally positioned central to the CBU in between the two double doors 103, 110. Pins 132 present on the adjacent slides of the double doors 108, 110 engage the sliding linkage 130 and hooks or recesses 134 especially designed to received such pins 132. The sliding linkage is slidably attached to the CBU chassis 112, but is generally held in its most downward position by gravity. By lifting upon the lever 136 of the sliding linkage 130, the sliding linkage 130 may be lifted along bolts passing into the sliding linkage 130 through gaps or the like, in order to raise the sliding linkage 130. As the hooks or recesses 134 need only be as long as the pins 132 are wide, the displacement of sliding linkage 130 required to release the door pins 132 can be correspondingly small and well within the easy articulation of the human hand.

The weight alone of the sliding linkage is sufficient to hold it down, locking the doors 108, 110 in place. As the double doors 108, 110 cannot move vertically upon their hinges, the doors 108, 110 cannot move in a way to disengage the sliding linkage 130 once they are thereby engaged. The doors 108, 110 only move horizontally, a direction which is against the vertically-articulating sliding linkage 130 when the doors 108, 110 are locked by the sliding linkage 130.

In order to provide securement for the door pins 132, the hooks or recesses 134 should be sufficiently reinforced in order to provide a strong barrier to the travel of the door pins 132 and the attached doors 108, 110 should the pins be brought into contact with the hooks 134. Such a circumstance could arise from a pry bar attack on the double doors 108, 110. As for the entirety of the CBU 100, 18 gauge stainless steel or other similarly durable and resilient materials may be used to construct the sliding linkage 130. As shown in FIG. 10, a special post person mail slot door 138 may be used to access the lift lever 136 to is thereby provide access to the entire interior confines of the CBU 100. The post person's mail slot box door 138 may itself have a insertion slot 140 into which letters, cards, and sufficiently small parcels may be inserted for pickup by the post person.

As is known in the art with respect to prior mailbox units, parcels may be delivered to individuals by means of the larger mailbox slots 150, 152. Keys fitting the doors that individually secure these parcel slots 150, 152 may be left in the mailbox slot for the person receiving the parcel. Parcels for a single individual can be left in either or both of the parcel boxes 150, 152 with the keys for their doors left in the person's mailbox slot by the post person. In this manner, persons may retrieve parcels from the CBU 100 without having to travel to the local post office in order to pick them up. Upon retrieving their parcels from the parcel slots 150, 152, the recipient may return the keys to the post person by inserting them through the insertion slot 140. As the receipt of parcels may only be made on an intermittent basis, such keys may actually be stored in the parcel slots 150, 152 themselves until needed.

As for the first interlocking door seam 30, above, the opposing flanges 160, 162 of the double doors 108, 110, respectively, participate in coordinated tandem in order to provide a more protected and less vulnerable shared seam which might be subject to attack by a thief. As indicated in FIGS. 9 and 11, the double doors 108, 110 may be constructed so that one double door, in this case the right double door 108, is dedicated as an interior double door that when closed is always interior to the outer double door, in this case door 110.

As shown in FIG. 11, the protruding flange 160 of the inner double door 108 fits into a receiving shroud 164 that receives and protects the exposed flange 160. The receiving shroud 164 could be added on into the interior of the outer double door 110 during construction adjacent its extending flange 162. Alternatively, a shroud 164 may be formed integrally with the door 110 in order to provide the smallest possible gap or separation 170 between the inner double door 108 with its flange 160 and the outer double door with its flange 162. For example, such a shroud 164 could be achieved without the use of the outer side of the shroud 174, trapping the inner door flange 160 between the inner side 172 of the shroud 164 and the outer door flange 162. When the receiving shroud 164 is added separately to the outer door 110, the outermost portion adjacent flange 162 may be extended farther in order to provide a significantly smaller space, if any, that might be used to insert the leading edge of a pry bar.

As shown in FIG. 11, the would-be thief has to work against several individual layers of strong metal or the like, in order to defeat the securement of the flange 160 of the inner door 108 in order to obtain access to the confines of the CBU 100.

For example, in order to defeat the receiving shroud 164 and its protection of the inner door flange 160, the thief has to engage in several arduous tasks. First, the thief must peel back the entirety of the external extending flange 162 to completely expose the inner internal flange 160. Initially, a thief might think by prying upon the seam 170 between the two doors, that the outer door 110 will be popped or otherwise liberated from its locking mechanism in order to allow that door to swing free. Instead, the thief must peel back the outer extending flange 162 to completely expose the inner protruding flange 160. In so doing, the thief must work against the inner extending flange 160 which itself presses against the inner portion of 172 of the receiving shroud 164. As the receiving shroud 164 is attached to the outer door 110, the thief is actually working the outer door 110 against itself. In prying back the outer extending flange 162, the thief is actually holding the outer door 110 in place via the inner edge of 172 the receiving shroud 164.

As the receiving shroud 164 generally extends the entire length of the extending flange 162, the thief must work all along the entire length of the outer door extending flange 162. As the thief is Generally working against the 18 gauge stainless steel or other similar material, this takes some time. During such time, the thief subjects himself to detection and arrest for tampering with mail, a federal felony.

If the thief should persist in the peeling back of the outer door extending flange 162, he or she will then encounter the inner door extending flange 160 which then must also be peeled back from the inner side 172 of the receiving shroud 164. As the thief must then work in the tighter confines of the remnants of the peeled back outer door extending flange 162, the pry bar may be limited in its working room in order to engage any gap or seam between the inner door extending flange 160 and the receiving shroud 164.

However, should the diligent thief pursue his or her efforts, upon subjecting him or herself to the second arduous task of peeling back the inner door extending flange 160, the thief now encounters the inner side 172 of the receiving shroud 164. This third layer must also be peeled away in order to obtain access to the sliding linkage 130 and/or the door pins 132 which must be disengaged from one another in order to allow the doors 108, 110 to swing upon their hinges and allow access to the confines of the CBU 100.

As can be seen by the foregoing, thieves who are looking for quick and easy access to is the CBU 100 are generally defeated by the difficulty encountered in forcing open the double doors 108, 110 at the common seam 170. Other doors known in the art subject to such attack and are generally easily opened if they do not have such mechanical measures taken to prevent such unauthorized access.

If a thief should, instead of attacking the entirety of the double doors, instead attack one of the individual mailbox slot doors 180 (FIGS. 10, 13 and 14), that thief will find that similar measures have been taken to ensure that such unauthorized excess is not easily achieved.

Figure 13:
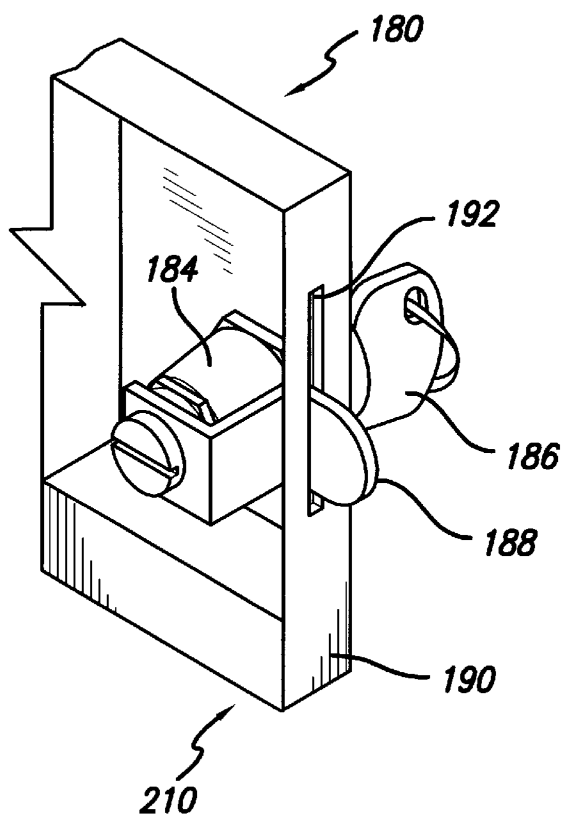
FIG. 13 is a top inside perspective view of an individual mailbox slot door with a protruding cam as indicated by Circle 13 in FIG. 10.
Figure 14:
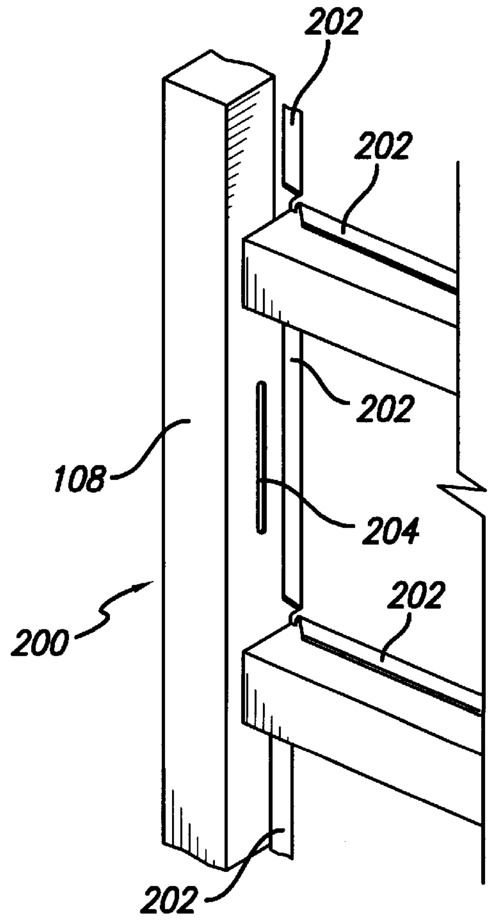
FIG. 14 is a top side perspective view of a mailbox door slot frame, corresponding to a mailbox slot door in FIG. 13, as generally indicated by Circle 14 in FIG. 10.

In order to provide full and complete access to the interior of the CBU 100, each of the double doors 108, 110 swing fully away from the central CBU chassis 112 area opening up the individual mail slots 182 for insertion of delivered mail. Each of the doors 108, 110 provide a frame in which a number of individual mailbox slot doors 180 articulate upon reinforced or otherwise protected hinges. As shown in FIGS. 13 and 14, each of the individual mailbox slot doors 180 has a lock 184 which may be pivoted by insertion of the proper key 186 in order to pivot a locking cam 188. The mailbox slot door 180 is not a flat plate, but instead is flanged on all three sides, those sides not connected to the mailbox slot door hinge. The side flange 190 has a slot or gap 192 through which the cam 188 articulates. If for some reason, the lock 184 should fail, the mailbox slot door 180 will not necessarily open as the cam 188 will not be displaced (by the lock failure) from its position (in a locked state) of travel through the side flange gap 192.

Turning now to FIG. 14, the right double door 108 provides a number of mailbox slot door frames 200 over which the mailbox slot doors 180 fit. Shrouds 202, much like the double door receiving shroud 164, receive the leading edges of the mailbox slot door flanges, including the side flange 190, in order to protect them from attack. Additionally, the mailbox slot door frame 200 has a cam slot 204 corresponding to the side flange slot 192 in the mailbox slot 180. In order to close the mailbox slot door 180, the key 186 must be turned in the lock 184 in order to pivot the cam 188 away from the side flange slot 192. The individual mailbox slot door 180 then closes with the flanges, with the frame flange receiving shrouds 202 receiving the mailbox slot door flanges, including the side flange 190.

When the mailbox slot door 180 is completely closed, the side flange slot 192 is directly opposite and aligned with the frame cam slot 204. The key 186 may then be turned the opposite direction in lock 184 in order to bring the locking cam 188 to travel through both the side flange slot 192 and then frame cam slot 204, thereby locking the mailbox slot door 180 into the double door 108. Upon removal of the key 186, the mailbox slot door 180 has been locked into place and cannot be opened until the key is inserted and turned in the lock 184.

The unlocking and opening of the individual mailbox slot door 180 allows a person to pick up their own mail without providing access to the other mailbox slots. The mailbox slot door key 186 for one individual mailbox slot door does not fit any of the other mailbox slot doors.

In order to obtain unauthorized access to the mailbox slot 182 by defeating the lock mechanism 184, as by using a pry bar, the would-be thief encounters several difficulties.

Should the thief attempt to defeat the lock mechanism 184 with a slide hammer or the like, the thief will first turn the slide hammer mechanism into the key slot (not shown) of lock 184. Upon so engaging the lock, the thief will then engage the slide hammer by slamming the sliding weight against the far end to attempt to defeat the lock 184. If the thief should succeed in the attempt, the thief will find that the side flange 190 with its flange slot 192 preserves the secure nature of the mailbox slot 182. Although the lock may be defeated 184, the lock's defeat does not remove the cam 188 from its position as inserted through both the side flange 190 through the side flange slot 192 and into the mailbox slot door frame 200 through the cam slot 204.

Although the owner or user of the mailbox slot 182 will no longer be able to access his or her mail via the mailbox slot door 180, the mailbox slot door 180 will not open as the side flange 190 engages the cam, preventing the mailbox slot door 180 from opening.

If the side flange 190 were not present, defeating the lock 184 would generally allow easier access to the mailbox slot 182 as the cam 188 could generally be pried away from the door frame 200 at frame cam slot 204. Such a defeat of the cam 188 becomes a more difficult endeavor with the presence of the side flange 190 with its side flange cam slot 192.

If, in addition to or alternatively, the thief attempts to pry the mailbox slot door 180 open, the thief encounters the same difficulties described above in conjunction with FIGS. 9 and 11 regarding the receiving shroud 164 and its engagement of the inner door extending flange 160.

When the thief tries to pry open the mailbox slot door 180, the thief does so by inserting the pry bar between the mailbox slot door frame 200 and one of the extending flanges present along the mailbox slot door 180, such as side flange 190, (FIG. 13). As the thief attempts to pry the door open, the flanges are secured by the receiving shrouds 202. The receiving shrouds 202 reinforce the side flanges (referred to generally herein by reference number 210). The reinforcement of the side flanges 210 by the receiving shrouds 202 effectively doubles, or even triples, the thickness of the side flanges 210. Because there is some separation, difference, and distinction between the side flanges 210 and their respective receiving shrouds 202, the strength available from the flange-shroud combination generally exceeds that of a piece of metal of the same thickness much in the same way that a cable provides greater strength than a single strand of metal of the same thickness.

A thief interested in an easy target will readily find that the CBU 100 of the present invention provides one of the least desirable targets with respect to mail theft. Consequently, it is of some advantage to provide a degree of high visibility to the CBU's of the present invention so that they may be easily recognized and easily avoided by thieves.

By providing shrouded flanges for intersecting door seams on both the double doors 108, 110 and the individual mailbox slot doors 180, the CBU 100 of the present invention provides enhanced barrier means preventing forced entry into the CBU. Additionally, the use of the sliding linkage 130 provides a greater degree of security as the extending door pins 132 are easily disengaged from the sliding linkage 130 by a post person with authorized access yet provide a significant and very difficult barrier to a thief.

While the present invention has been described with regards to particular embodiments, it is recognized that additional variations of the present invention may be devised without departing from the inventive concept.

What is claimed is:

1. A cluster box unit (CBU) for securing and protecting mail, comprising:

a plurality of mailbox slots;

a double door having a first outer door and a second inner door, said double door covering and protecting said plurality of mailbox slots, said first outer door overlapping said second inner door;

a plurality of mailbox slot doors, each one of said mailbox slot doors corresponding to an individual one of said plurality of mailbox slots, said mailbox slot doors imbedded in and a part of said double door;

extending pins, said extending pins extending from said first and second doors;

a sliding linkage, said sliding linkage sliding upon the CBU and receiving said pins, said sliding linkage holding said pins in place and holding said double door closed when said sliding linkage is in a first position, said sliding linkage releasing said pins and allowing said double door to open when said sliding linkage is in a second position; and a concave shroud attached to said first outer door, said concave shroud receiving a leading edge of said second inner door; whereby a seam present between said first and second doors better defends against being pried open as said second inner door is protected by said concave shroud to better secure and protect mail held in the CBU.

2. A cluster box unit (CBU) for securing and protecting mail, comprising:

a plurality of mailbox slots;

a double door having a first outer door and a second inner door, said double door covering and protecting said plurality of mailbox slots, said first outer door overlapping said second inner door;

a plurality of mailbox slot doors, each one of said mailbox slot doors corresponding to an individual one of said plurality of mailbox slots, said mailbox slot doors imbedded in and a part of said double door;

said double door including a plurality of mailbox slot door frames, said plurality of mailbox slot door frames corresponding to said plurality of mailbox slots and said plurality of mailbox slot doors, each of said plurality of mailbox slot door frames defining a locking frame slot;

a concave shroud attached to said first outer door, said concave shroud receiving a leading edge of said second inner door;

a mailbox slot door of said plurality of mailbox slot doors includes a front plate;

top, side and bottom flanges attached to said front plate, said side flange connected to said top and bottom flanges, said side flange defining a locking door slot, said locking door slot aligning with said locking frame slot when said mailbox slot door is closed;

a lock, said lock imbedded in said front plate; and a cam, said cam connected to said lock behind said front plate, said cam passing though said locking door slot and said locking frame slot when said mailbox slot door is closed and locked; whereby a seam present between said first and second doors better defends against being pried open as said second inner door is protected by said concave shroud to better secure and protect mail held in the CBU and said mailbox slot door remains locked and does not open as said cam passes through said side flange and said mailbox slot door frame despite the breaking of said lock.

3. The CBU of claim 2, wherein each of said mailbox slot door frames further comprises:

a top concave shroud, said top concave shroud receiving said top flange of a corresponding mailbox slot door;

a side concave shroud, said side concave shroud receiving said side flange of a corresponding mailbox slot door; and a bottom concave shroud, said bottom concave shroud receiving said bottom flange of a corresponding mailbox slot door; whereby top, side, and bottom seams present between said mailbox slot door frame and said mailbox slot door is protected by attack from prying by shrouding said top, side, and bottom flanges.

4. The CBU of claim 3, further comprising:

each of said mailbox slot doors of said plurality of mailbox slot doors have top, side, and bottom flanges are respectively shrouded by said top, side and bottom concave shrouds of corresponding mailbox slot door frames.

5. A cluster box unit (CBU) for securing and protecting mail, comprising:

a plurality of mailbox slots;

a double door having a first outer door and a second inner door, said double door covering and protecting said plurality of mailbox slots, said first outer door overlapping said second inner door, said first door having extending pins, said second door also having extending pins, said extending pins of said first door generally opposite said extending pins of said second door when said first and second doors are closed;

a plurality of mailbox slot door frames embedded in said double door, said plurality of mailbox slot door frames corresponding to said plurality of mailbox slots, each of said plurality of mailbox slot door frames defining a locking frame slot, each of said plurality of mailbox slot door frames having a top concave shroud, a side concave shroud, and a bottom concave shroud, each of said shrouds for closely receiving a mailbox slot door flange;

a plurality of mailbox slot doors, each one of said mailbox slot doors corresponding to an individual one of said plurality of mailbox slots, said mailbox slot doors imbedded in and a part of said double door in corresponding ones of said plurality of mailbox slot door frames, each of said mailbox slot doors having a front plate, top, side and bottom flanges attached to said front plate, said side flange connected to said top and bottom flanges, said top flange fitting into a top concave shroud of said corresponding mailbox slot door frame, said side flange fitting into a side concave shroud of said corresponding mailbox slot door frame, and said bottom flange fitting into a bottom concave shroud of said corresponding mailbox slot door frame, said side flange defining a locking, door slot, said locking, door slot aligning with said locking frame slot when said mailbox slot door is closed, a lock, said lock imbedded in said front plate, and a cam, said cam connected to said lock behind said front plate, said cam passing though said locking door slot and said locking frame slot when said mailbox slot door is closed and locked so that said mailbox slot door remains locked and does not open as said cam passes through said side flange and said mailbox slot door frame despite the breaking of said lock by a slide hammer or the like;

a concave shroud attached to said first outer door, said concave shroud receiving a leading edge of said second inner door in a close manner;

a sliding linkage, said sliding linkage sliding upon the CBU and receiving said extending pins of both said first and second doors, said sliding linkage holding said extending pins in place and holding said double door closed when said sliding linkage is in a first position, said sliding linkage releasing said extending pins and allowing said double door to open when said sliding linkage is in a second position; whereby a seam present between said first and second doors better defends against being pried open as said second inner door is protected by said concave shroud to better secure and protect mail held in the CBU and top, side, and bottom seams present between each of said mailbox slot doors and each of said corresponding mailbox slot door frames is protected by attack from being pried open by said top, side and bottom shrouding extending flanges present on each of said mailbox slot doors.

* * * * *